United States Patent [19]

Nowak et al.

[11] 4,120,941
[45] Oct. 17, 1978

[54] PROCESS FOR THE OXIDATION OF HALIDES

[75] Inventors: Rudolf Nowak; Gerhard Holland, both of Frankfurt am main, Fed. Rep. of Germany

[73] Assignee: Halomet AG, Basel, Switzerland

[21] Appl. No.: 519,505

[22] Filed: Oct. 31, 1974

[51] Int. Cl.$^2$ .............................................. C01B 13/14
[52] U.S. Cl. ................................... 423/592; 423/500; 423/613; 423/625; 423/633
[58] Field of Search .................... 423/613, 659, 659 A, 423/633, 592, 625, 500

[56] References Cited

U.S. PATENT DOCUMENTS

| | | | |
|---|---|---|---|
| 2,240,343 | 4/1941 | Muskat ................................. | 423/613 |
| 2,657,979 | 11/1953 | Saladin et al. ....................... | 423/613 |
| 2,670,272 | 2/1954 | Nutting ................................. | 423/613 |
| 2,937,928 | 5/1960 | Hughes et al. ....................... | 423/613 |
| 3,022,137 | 2/1962 | Nelson ................................. | 423/613 |
| 3,203,763 | 8/1965 | Kruse ................................... | 423/613 |
| 3,376,112 | 4/1968 | Dunn, Jr. et al. ............... | 423/633 X |
| 3,526,477 | 9/1970 | Wu Wan ............................. | 423/613 |
| 3,532,462 | 10/1970 | Zirngibl et al. ..................... | 423/613 |
| 3,790,369 | 2/1974 | Olsson et al. ....................... | 423/659 |
| 3,914,396 | 10/1975 | Bedetti et al. .................. | 423/659 X |

Primary Examiner—O. R. Vertiz
Assistant Examiner—Thomas W. Roy
Attorney, Agent, or Firm—Learman & McCulloch

[57] ABSTRACT

Process of oxidizing halides, including mixtures thereof, with oxygen, oxygen-containing gases and/or oxygen-liberating substances in a combustion chamber, whereby the vapor pressure of the halides at introduction to the combustion or oxidation chamber is greater than the pressure within the combustion chamber. Recovery of halides at greater purity with substantial decrease of by-product deposits on operating equipment is realized.

6 Claims, 1 Drawing Figure

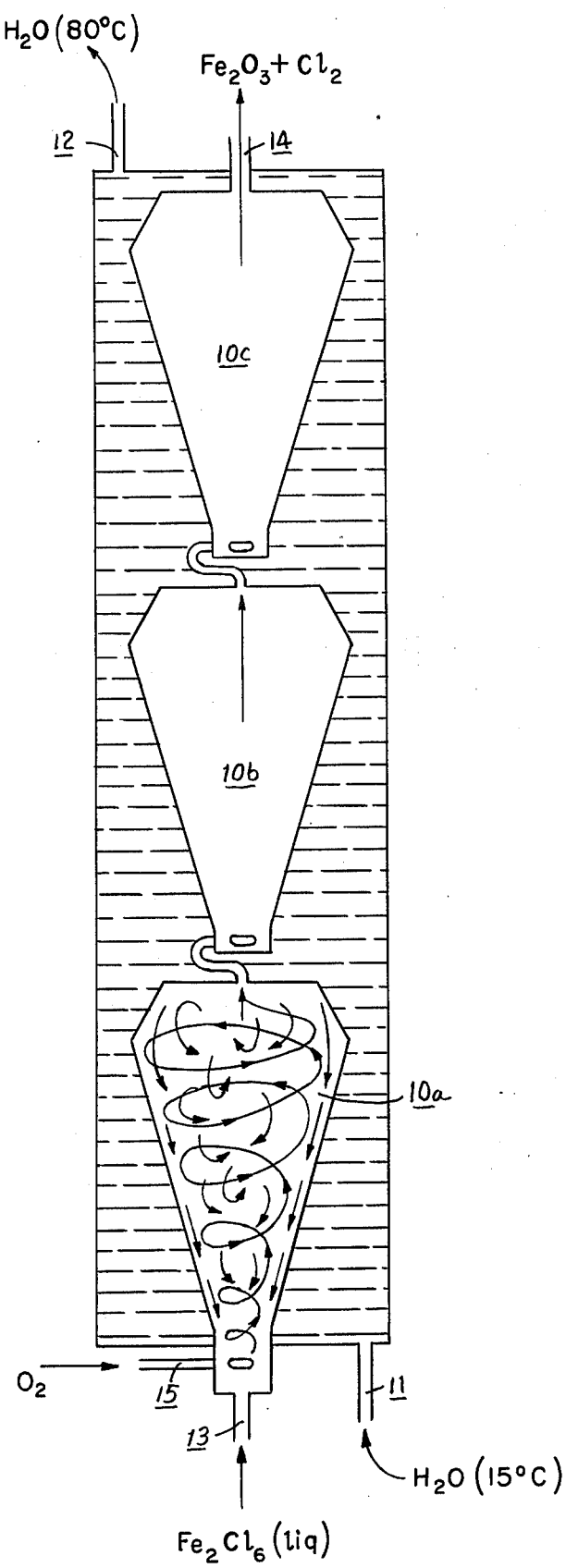

PROCESS FOR THE OXIDATION OF HALIDES

The invention relates to a process for the oxidation of halides or halide mixtures thereof with oxygen, oxygen-containing gases and/or oxygen-liberating substances, and more particularly to a process where recovery of halogen from said halides is of substantial purity and where the properties of the by-products, e.g., oxide powders, are improved.

Processes for the combustion (oxidation) of halides are known whereby oxide powders are produced and/or halogens recovered in usable or useful form. In such known methods halides recovered by the halogenation of ores, slags, roasted pyrites and other solid mixtures are reacted with oxygen, oxygen-containing gases (e.g., air) or oxygen-liberating substances (e.g., oxides) to form oxides and halogens or halides. The chemical processes occurring correspond to reaction types exemplified by the following:

$$2 FeCl_3 (g) + 2/3) O_2 (g) = Fe_2O_3 (s) + 3 Cl_2 (g)$$

$$SiCl_4 (g) + 3 H_2 (g) + (3/2) O_2 (g) = SiO_2 (s) + 4 HCl (g) + H_2O (g)$$

$$TiBr_4 (g) + CO (g) + (3/2) O_2 (g) = TiO_2 (s) + 2 Br_2 (g) + CO_2 (g)$$

$$TiCl_4 (g) + SnO_2 (s) = TiO_2 (s) + SnCl_4 (g)$$

To be commercially acceptable, at least for select applications, particular properties are required for the solids formed in or by the oxidation, especially as regards purity, grain size and grain form. In addition, the chemical conversion during oxidation or combustion preferably is a high as possible, and the equipment employed such as fluidized beds, combustion chambers, and burner nozzles must not become incrustated with products of the reaction. In most operations the desired gaseous combustion product is a halogen containing the minimum possible oxygen or other contaminant gases or halide moiety so as to permit direct use of the halogen.

Many attempts have been made heretofore to achieve optimum results as outlined above. However, to date no process has been developed which meets all the requirements. Failure is due to various factors. Thus, in the combustion of halides, the higher the combustion temperatures, the more unfavorable the majority of gas or vapor equilibriums. Accordingly, in known processes the combustion temperature is reduced by using, for example, a correspondingly large excess of oxygen or other ballast gas which absorbs part of the heat of combustion and consequently has a cooling effect. However, the economy of such procedures is altered by the subsequent necessity of separating the halogen from the ballast gas. Moreover, in many known processes, for example the chlorination of ilmenite for producing synthetic rutile, halide mixtures are formed and not the individual pure halides. Combustion of such mixtures is particularly difficult because they contain halides of both lower and much higher boiling points.

Accordingly, the primary objective underlying the present invention is the development of a process for the combustion of halides which avoids the defects of the known processes, and provides a maximum chemical conversion during combustion and substantially eliminates the danger of incrustation of the operating equipment. The aforesaid and other objectives are accomplished according to the present invention by selecting the temperature of the halides supplied to the combustion or oxidation chamber and/or the pressure in the combustion or oxidation chamber so that the vapor pressure of the halides supplied is greater than the pressure in the combustion chamber. For example, a superheated halide in liquid or solid state is delivered to the combustion chamber through a nozzle or the like so that the halide or halides vaporize at the instant it leaves the nozzle, i.e., as it enters the combustion chamber, with complete spontaneity, enormously increasing the combustion kinetics. According to the process, if the halides used in the combustion are halide mixtures including high-boiling halide fractions which possibly do not completely vaporize, these high-boiling halides become finely dispersed with sufficient energy so that they behave kinetically in the reaction like vapors and participate similarly in the combustion. Consequently, even with such mixtures no difficulties are encountered.

Inasmuch as, with useful materials, the reaction velocity is not always high enough to achieve on combustion a chemical conversion corresponding to the thermodynamical equilibrium, it may be desirable to increase the reaction velocity catalytically. Thus, the chemical conversion can be substantially improved if in accordance with the invention slight quantities of halogens other than those in the halides to be oxidized are added to the reacting system. These halogens may be in elementary state or combined with other elements and include HF, $CBr_4$, $HSiI_3$, F, I, Br, etc. Moreover, to eliminate more completely incrustations in the combustion chamber in spite of high combustion temperatures and to obtain favorable gas equilibriums and thus high chemical conversions, it can be desirable in accordance with the invention to conduct the reaction mixture through one or more cooled chambers. Reducing the temperature of the system subsequent to introduction of the reactants gives a favorable equilibrium. Therefore, the addition of ballast gas and the uneconomical gas separation may be dispensed with and, further, solids do not sinter onto the cooled inner walls of the combustion chamber.

To enable large quantities of reactants to be put through relatively small apparatuses and nevertheless achieve in addition to a maximum chemical conversion a long path of contact of the reacting substances, it can be desirable according to the invention to conduct the reaction mixture through at least one conically widening chamber. The suction of the axial portion results in the peripheral portions being constantly drawn towards the axis in an eddy motion. Additionally, a further lengthening of the reaction path and more complete elimination of, or prevention of incrustation at the widening chamber walls can be achieved according to the invention if the reaction mixture is rotated. For this purpose a great variety of forms of eddy chambers can be used as combustion chambers, for example with tangential entry and axial outlet. As a further modification of the present invention the chemical conversion within the combustion chamber can be improved by carrying out combustion reactions coincident with an increase in volume at a pressure which is smaller than 1 atm, or with a decrease in volume at a pressure which is greater than 1 atm.

The high chemical conversions achieved with the process according to the invention and the other advantages, particularly the avoidance of incrustation of nozzle, combustion chamber, etc., will be clear from a more complete description, including the following examples of preferred embodiments.

EXAMPLE 1

Iron chloride ($Fe_2Cl_6$) was burned with industrial oxygen (about 98% by volume $O_2$ and about 2% by volume $N_2$) in a cylindrical chamber whose inner walls were lined with sillimanite by means of a double nozzle from an oil burner as follows:

(a) 1st test

Temperatures:

| | |
|---|---|
| $Fe_2Cl_6$, liquid | 325° C |
| industrial $O_2$ | 21° C |
| temperature at hottest part of reaction zone | 750° C |
| $Fe_2O_3$ and chlorine-containing exhaust gas | 740° C |

The vapor pressure of the molten $Fe_2Cl_6$ in a closed container was slightly below 1 atm, and the delivery pressure was generated with compressed air in the container. The pressure in the combustion chamber was exactly 1 atm. The exhaust gas of the combustion had the following composition in % by volume:

| | |
|---|---|
| $Cl_2$ | 92.43 |
| $Fe_2Cl_6$ | 3.33 |
| $O_2$ | 2.22 |
| $N_2$ | 2.02 |

After 40 minutes combustion the double nozzle was incrustated with $Fe_2O_3$ to such an extent that the combustion operation came to a stop. At the inner walls of the combustion chamber deposits had formed which threatened to clog the chamber if operation were continued.

(b) 2nd test

The $Fe_2Cl_6$ was heated in a closed pressure vessel to 440° C. and its vapor pressure rose to 3 atm. It was possible to carry on combustion with this "superheated" melt for as long as desired without incrustations forming at the burner nozzle. The combustion chamber did become increasing incrusted with deposits of $Fe_2O_3$ with time. The exhaust gas composition remained substantially the same throughout the reaction and the temperature in the hottest part or section of the reaction zone was 860° C.

(c) 3rd test

The cylindrical sillimanite chamber was replaced by three conically widened chambers made up of copper sheet as shown in the drawing. These chambers, 10a, 10b, and 10c, are water cooled, water at 15° C. being fed into inlet 11 and the warm water taken off at outlet 12. The $Fe_2Cl_6$ was again supplied to the burner nozzle as a superheated melt of 440° C. and 3 atm vapor pressure at inlet 13. In this third test the $Fe_2O_3$ passed out of the apparatus at outlet 14 along with the exhaust gas at a temperature of 450° C. $O_2$ is fed into chamber 10a at inlet 15. The composition of the gas was as follows in % by volume:

| | |
|---|---|
| $Cl_2$ | 96.41 |
| $Fe_2Cl_6$ | 0.65 |
| $O_2$ | 0.98 |
| $N_2$ | 1.96 |

A thermodynamic calculation showed that the gas equilibrium during the cooling of the reaction products from 860° C. to about 600° C. switched over continuously, considerably increasing the chlorine yield and substantially reducing the portion of iron chloride and oxygen.

(d) 4th test

The procedure was as in (c) above but 0.01% by volume bromine vapor was added to the oxygen. The resulting exhaust gas had the following composition (in % by volume):

| | |
|---|---|
| $Cl_2$ | 97.71 |
| $Fe_2Cl_6$ | 0.13 |
| $O_2$ | 0.20 |
| $N_2$ | 1.95 |
| $Br_2$ | 0.01 | from which it can be calculated that the gas equilibrium during the cooling of the reaction products from 860° C. to about 500° C. changed continuously. The chlorine yield is surprisingly high and the portions of iron chloride and oxygen very low.

In the aforesaid tests all conditions, including feed rate, and raw materials remained the same except for the stated modifications.

EXAMPLE 2

(a) 1st test

Titanium bromide ($TiBr_4$) was heated in a container to 230° C. (0.85 atm) and conducted by means of compressed air pressure acting on the molten $TiBr_4$ to a double nozzle to which combustion air was also supplied. The combustion chamber adjoining the nozzle at a pressure of approximately 1 atm had a conical form; it consisted of a gas-tight steel casing, an insulating layer of sillimanite wool and a lining of sillimanite. The reaction products $TiO_2$ and the exhaust gas left the combustion chamber at a temperature of 1150° C. The exhaust gas had the following composition in % by volume:

| | |
|---|---|
| $Br_2$ | 33.57 |
| $N_2$ | 66.43 |

After some time a crust formed on the end face of the double nozzle. X-ray investigations showed that the $TiO_2$ particles formed exhibited a rutile lattice. Their mean grain size was 1.5μ.

(b) 2nd test

This part of the example was conducted as in (a) above, however, provision was made for maintaining in the combustion chamber a pressure of only 0.3 atm by evacuating the resulting dust-gas mixture through a gastight connected cooler, a dust separation cyclone and a dust filter. Since the molten $TiBr_4$ passing at a temperature of 230° C. to the nozzle had a vapor pressure of 0.85 atm, it vaporized spontaneously on leaving the nozzle. The nozzle remained free of any incrustation whatever even after long periods of operation. The rutile particles were surprisingly larger, their mean diameter being 2.7μ. This effect is believed due to a substantially better mixing of the substances taking part in the reaction and the consequent more rapid growth of the rutile particles. The exhaust gas (1130° C.) again consisted only of bromine vapor and nitrogen; no $TiBr_4$ or $O_2$ could be detected.

EXAMPLE 3

Aluminum halide ($Al_2Br_6$) was heated in a closed pressure vessel to 420° C. At a temperature of 400° C and a specific vapor pressure of 9.4 atm the $Al_2Br_6$ melt was passed through a heat-insulated tube to the burner nozzle. On emerging from the nozzle the melt evaporated spontaneously, mixed with the combustion air and burnt in a cooled combustion chamber completely to $Al_2O_3$ and bromine. The temperature of the hottest reaction zone was 1530° C.

The foregoing examples emphasize the advantages of the disclosed process. Not only is the rate of conversion increased, but the percentage of conversion is increased to provide a halogen of greater purity. Further, the oxides formed as the secondary or by-product of the reaction have greatly improved properties enhancing their useful application. Finally, as apparent, the operating equipment remains free of incrustation.

Although in the examples, the oxidation was carried out with industrial oxygen, the oxygen for the oxidation or combustion of the halides can be supplied by any available means including pure oxygen, mixtures of oxygen with inert gases or as an oxide wherein oxygen is liberated in situ at the temperature of the reaction. Moreover, the process can be applied with equal effectiveness to halides recovered in the halogenation of ores, slags, or the like, other than the ones specifically noted, regardless of whether such halides are in the gaseous, liquid, or solid state when introduced into the oxidation chamber. As will be apparent, the temperature of the oxidation or combustion will be determined by the particular substance employed in the oxidation process. Further, the vapor pressure of the halides can be increased in relation to the pressure of the combustion chamber by either increasing the temperature of the halides at the time of introduction into the chamber, or the pressure of the combustion chamber can be lowered. The critical feature is that the vapor pressure of the halide at time of introduction into the reaction chamber is greater than the pressure within the combustion chamber.

It should be apparent that the instant invention is not to be construed as being limited by the illustrative embodiments. It is possible, as noted, to produce other embodiments without departing from the inventive concept herein disclosed. Such embodiments are within the ability of one skilled in the art.

It is claimed:

1. In a process for the oxidation of halides or mixtures thereof with oxygen or oxygen-containing gases in an oxidation chamber, the improvement wherein solid or liquid halides are supplied to the oxidation chamber through an inlet nozzle, the temperature at which said solid or liquid halides are supplied to the oxidation chamber and/or the pressure in the oxidation chamber being selected so that the vapor pressure of the halides supplied is greater than the pressure in the oxidation chamber, up to or substantially to the critical temperature of said halides to thereby prevent any substantial crust formation at or on the inlet nozzle.

2. Process according to claim 1, including the further improvement whereby small quantities of halogens other than those in the halides to be oxidized are added to the reaction system.

3. Process according to claim 1, including the further improvement whereby the reaction mixture is conducted through one or more cooled chambers.

4. Process according to claim 1, including the further improvement whereby the reaction mixture is conducted through at least one conically widening chamber.

5. Process according to claim 1, including the further improvement whereby the reaction mixture within the oxidation chamber is in rotation.

6. Process according to claim 1, including the further improvement whereby the chemical conversion is improved in that oxidation reactions resulting in an increase in volume are carried out at a pressure which is less than 1 atm and reactions which result in a decrease in volume are carried out at a pressure which is greater than 1 atm up to, or substantially to the critical temperature of the halides supplied.

* * * * *